J. S. LASH.
Improvement in Shutter-Fasteners.
No. 115,965. Patented June 13, 1871.
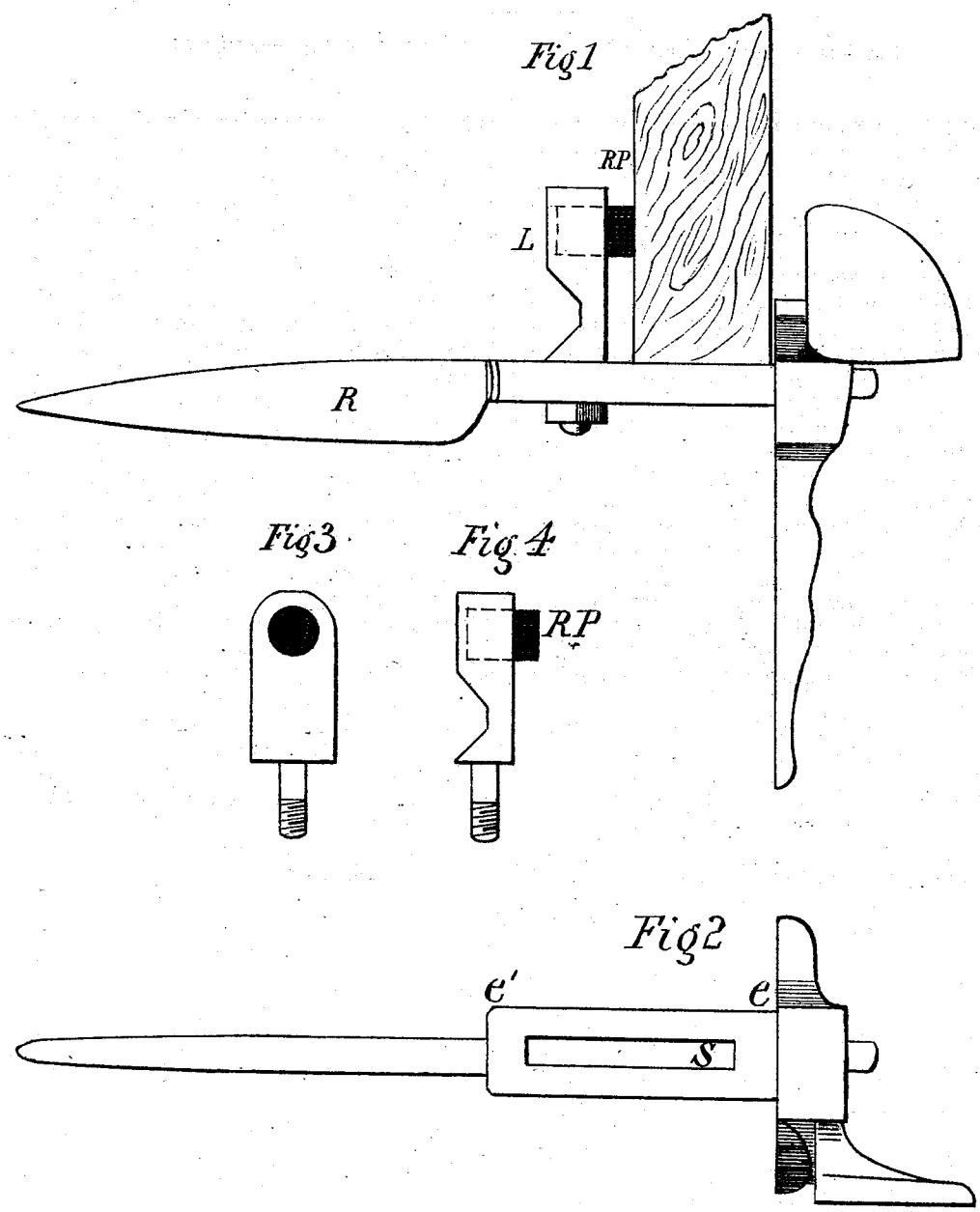
Witnesses
Robert C. Parmer,
Frank Stout
Inventor
John S. Lash.
by his attorney
Joseph Evans.

115,965

UNITED STATES PATENT OFFICE.

JOHN S. LASH, OF PHILADELPHIA, PENNSYLVANIA, ASSIGNOR TO HIMSELF AND JONATHAN R. SELTZER.

IMPROVEMENT IN SHUTTER-FASTENERS.

Specification forming part of Letters Patent No. 115,965, dated June 13, 1871.

I, JOHN S. LASH, of the city and county of Philadelphia and State of Pennsylvania, have invented a new and useful Improvement in Fastening Window-Shutters, of which the following is a specification:

The object of my invention is expressed in the title; and consists in attaching to the rod (on the end of which is attached and revolves an ordinary turn-buckle) a sliding lug provided with a rubber plug, said lug working in a slot formed or cast in the rod, in order to adjust the lug according to the thickness of the shutter, thus effectually preventing any rattling of the same.

Upon reference to the drawing it will be seen that Figure 1 is a side view of the rod and turn-buckle, showing my device as applied in order to retain the shutter firmly between the lug and turn-buckle. Fig. 2 is a view, showing the slot in which the lug is moved backward or forward in order to adjust it to suit the thickness of the shutter. Fig. 3 is a detached view of the lug used. Fig. 4 is a side view of same.

To enable those skilled in the art to make and use my invention, I will now proceed to describe its construction and operation.

The spike or rod R, on which is attached the turn-buckle, is made in the usual form with the exception that it is somewhat spread and made perfectly flat from the point $e$ to the point $e'$. Running lengthwise with the rod between the points $e$ and $e'$ is formed a slot, S, as shown in Fig. 2. Inserted in said slot, and sliding freely in it, is a lug, L, as shown in Figs. 3 and 4. The upper part of this lug is provided with a circular opening, in which is inserted a rubber plug, R P, said plug extending slightly beyond the face of the lug, as shown in Fig. 4. On the under part of the lug is formed a short arm which slides in the slot S. Said arm has cut on it a thread, on which screws a nut, in order to hold the lug firmly in the desired place.

In operating my device the lug is adjusted according to the thickness of the shutter—that is to say, that the space between the end of the rubber plug R P (which extends beyond the face of the lug) and the back of the turn-buckle should be same as the thickness of the shutter, as shown in Fig. 1.

Having thus described my invention, its construction, and operation, what I claim, and desire to secure by Letters Patent, is—

The lug L, provided with the rubber plug R P, said lug sliding in the slot S of the rod R, substantially in the manner and for the purpose specified.

JOHN S. LASH.

Witnesses:
CHARLES H. EVANS,
FRANK STOUT.